(12) United States Patent
Weipert et al.

(10) Patent No.: US 11,421,049 B2
(45) Date of Patent: Aug. 23, 2022

(54) PHOTOPOLYMERIZATION SYNERGIST

(71) Applicant: Piedmont Chemical Industries, LLC, High Point, NC (US)

(72) Inventors: Paul D. Weipert, High Point, NC (US); Theodosios Diplas, High Point, NC (US); Michael Christian Meers, High Point, NC (US)

(73) Assignee: Piedmont Chemical Industries, LLC, High Point, NC (US)

( * ) Notice: Subject to any disclaimer, the term of this patent is extended or adjusted under 35 U.S.C. 154(b) by 0 days.

(21) Appl. No.: 17/090,221

(22) Filed: Nov. 5, 2020

(65) Prior Publication Data

US 2021/0139616 A1 May 13, 2021

Related U.S. Application Data

(60) Provisional application No. 62/934,751, filed on Nov. 13, 2019.

(51) Int. Cl.
*C08F 2/50* (2006.01)
*C08F 222/20* (2006.01)

(52) U.S. Cl.
CPC .............. *C08F 2/50* (2013.01); *C08F 222/20* (2013.01)

(58) Field of Classification Search
CPC ....... C08F 2/50; C08F 222/20; C08F 222/102
See application file for complete search history.

(56) References Cited

U.S. PATENT DOCUMENTS

| | | | |
|---|---|---|---|
| 3,702,837 A | 11/1972 | Gilles | |
| 4,518,473 A | 5/1985 | Jacobine | |
| 5,607,817 A * | 3/1997 | Nagasaka | C08F 2/50 430/281.1 |
| 6,555,593 B1 * | 4/2003 | Hoyle | G03F 7/031 522/63 |
| 7,297,306 B2 | 11/2007 | Santobianco et al. | |
| 7,994,245 B2 | 8/2011 | Deshpande et al. | |
| 2004/0198859 A1 * | 10/2004 | Nguyen | C08F 2/50 522/26 |
| 2004/0235967 A1 * | 11/2004 | Espinoza | C10G 2/32 518/726 |
| 2004/0235976 A1 | 11/2004 | Hoyle et al. | |

(Continued)

OTHER PUBLICATIONS

Zhou et al. "Progress in the Development of Polymeric and Multifunctional Photoinitiators in Progress", Polymer Science, Oct. 5, 2019, vol. 99, p. 1-16.

(Continued)

*Primary Examiner* — Sanza L. McClendon
(74) *Attorney, Agent, or Firm* — Joseph T. Guy; Patent Filing Specialist Inc.

(57) ABSTRACT

An a photopolymerization formulation is provided as is an improved method for forming an object using the formulation. The formulation comprises a polymerizable ethylenically unsaturated monomer, oligomer or polymer; a photoinitiator; and a synergist selected from the group consisting of Formula I, Formula II and Formula III;

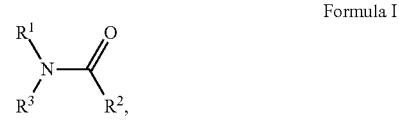

Formula I

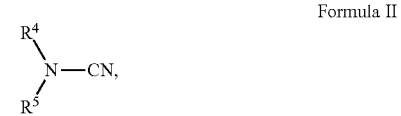

Formula II

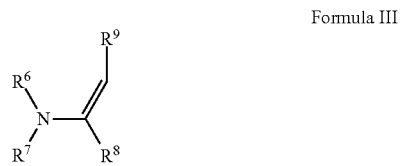

Formula III wherein:

$R^1$, $R^4$, $R^6$ and $R^9$ are independently selected from an alkene, a cyclic olefin, aryl, cyclic heteroatom containing group or acylic heteroatom containing group each of which is optionally substituted;

$R^2$ and $R^8$ are independently selected from hydrogen; linear or branched alkyl of 1 to 10 carbons; aryl; —C(O)R$^{10}$; —NR$^{11}$R$^{12}$; or —COR$^{15}$;

$R^3$, $R^5$ and $R^7$ are independently selected from hydrogen, saturated or unsaturated, cyclic or acyclic, optionally substituted alkyl of 1-20 carbons or optionally substituted aryl of no more than four fused aromatic rings;

$R^2$ and $R^3$ or $R^7$ and $R^8$ may be taken together in each Formula to form a saturated or unsaturated optionally substituted ring;

$R^{10}$ and $R^{15}$ independently a saturated or unsaturated, cyclic or acyclic, optionally substituted alkyl of 1-20 carbons; carboxylic acid; ketone or an ester; and $R^{11}$ and $R^{12}$ are independently selected from hydrogen; saturated or unsaturated, cyclic or acyclic, optionally substituted alkyl of 1-20 carbons; optionally substituted aryl with up to five fused aromatic rings.

45 Claims, No Drawings

(56) References Cited

U.S. PATENT DOCUMENTS

2008/0132601 A1* 6/2008 Hoyle .................. C08F 2/50
                                                        522/180
2013/0012611 A1   1/2013 Davidson et al.

OTHER PUBLICATIONS

ISA/US; ISR and Written Opinion prepared for PCT/US2020/059075; dated Feb. 2, 2021.
IPEA/US; International Preliminary Report on Patentability; prepared for PCT/US2020/059075; dated Oct. 15, 2021.

* cited by examiner

PHOTOPOLYMERIZATION SYNERGIST

CROSS-REFERENCE TO RELATED APPLICATIONS

The present invention claims priority to U.S. Provisional Application No. 62/934,751 filed Nov. 13, 2019 which is incorporated herein by reference.

FIELD OF THE INVENTION

The present invention is related to improvements in the photopolymerization of monomers and improved photopolymerization formulations. More specifically, the present invention is related to the use of novel synergist which improve the photonic efficiency of a photopolymerization formulation.

BACKGROUND

Photopolymerization is a well-advanced art which is widely used in the production of materials as diverse as inks, coatings, dental materials, 3-D printing and the like. Though widely practiced, there is an ongoing desire to provide improvements. Most relevant is the desire for improvements in photon efficiency or, simply put, improvements in the number of reacted monomers as a function of the number of photons applied.

The desire for improved photon efficiency is related to manufacturing efficiency the importance of which needs no further explanation. The desire for photon efficiency is also important for increasing the depth of penetration since the photon flux decreases with distance through a photopolymerization formulation. Higher photon efficiency is therefore correlated to the depth of polymerization. Being able to polymerize at deeper depths has significant advantages in 3-D printing applications and allows for the use of thicker coatings when applied to a surface.

In the photopolymerization of unsaturated monomers with UV light, a photoinitiator is used to create a free radical. The free radical produced then begins the polymerization of the unsaturated monomers. In many instances, even after absorption of UV light, the photoinitiator fails to begin the polymerization. In an effort to make the photoinitiators more effective at beginning a polymerization certain compounds have been found to facilitate the formation of a free radical by reacting with the photoinitiator. These compounds are referred to as synergists. Effective synergists allow for the reduction in the amount of the photoinitiator(s) used in the formulation. Commonly used synergists are amines such as N-methyldiethanolamine (MDEA), ethyl-4-dimethylaminobenzoate (EPD) and 2-ethylhexyl-4-dimethylaminobenzoate (EHA). It is thought that these compounds form a free radical on the carbon adjacent to the nitrogen atom.

Though widely used, commonly available synergist still fail to provide adequate photon efficiency. Provided herein are synergist which increase photon efficiency leading to a reduction in the amount of photoinitiator required in a photopolymerization formulation and to increased depth of penetration of polymerization.

SUMMARY OF THE INVENTION

The present invention is related to improvements in photopolymerization and improved photopolymerization formulations.

More specifically, the present invention is related to improved synergist for photopolymerization.

A particular feature of the invention is the ability to decrease the amount of photoinitiator in a photopolymerization formulation.

Yet another embodiment is provided in a photopolymerization formulation with improved photon efficiency.

These and other embodiments, as will be realized, are provided in a photopolymerization formulation comprising: a polymerizable ethylenically unsaturated monomer, oligomer or polymer; a photoinitiator; and a synergist selected from the group consisting of Formula I, Formula II and Formula III;

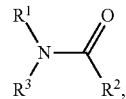

Formula I

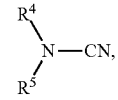

Formula II

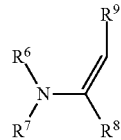

Formula III wherein:

$R^1$, $R^4$, $R^6$ and $R^9$ are independently selected from an alkene, a cyclic olefin, aryl, cyclic heteroatom containing group or acylic heteroatom containing group each of which is optionally substituted;

$R^2$ and $R^8$ are independently selected from hydrogen; linear or branched alkyl of 1 to 10 carbons; aryl; —C(O)$R^{10}$; —NR$^{11}$R$^{12}$; or —COR$^{15}$;

$R^3$, $R^5$ and $R^7$ are independently selected from hydrogen, saturated or unsaturated, cyclic or acyclic, optionally substituted alkyl of 1-20 carbons or optionally substituted aryl of no more than four fused aromatic rings;

$R^2$ and $R^3$ or $R^7$ and $R^8$ may be taken together in each Formula to form a saturated or unsaturated optionally substituted ring;

$R^{10}$ and $R^{15}$ independently a saturated or unsaturated, cyclic or acyclic, optionally substituted alkyl of 1-20 carbons; carboxylic acid; ketone or an ester; and $R^{11}$ and $R^{12}$ are independently selected from hydrogen; saturated or unsaturated, cyclic or acyclic, optionally substituted alkyl of 1-20 carbons; optionally substituted aryl with up to five fused aromatic rings.

Yet another embodiment is provided in a method of forming an object comprising:

forming a photopolymerization formulation comprising:

a polymerizable ethylenically unsaturated monomer, oligomer or polymer;

a photoinitiator; and a synergist selected from the group consisting of Formula I, Formula II and Formula III;

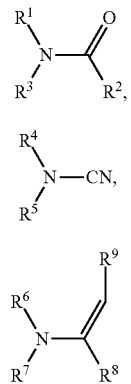

Formula I

Formula II

Formula III wherein:
$R^1$, $R^4$, $R^6$ and $R^9$ are independently selected from an alkene, a cyclic olefin, aryl, cyclic heteroatom containing group or acylic heteroatom containing group each of which is optionally substituted;
$R^2$ and $R^8$ are independently selected from hydrogen; linear or branched alkyl of 1 to 10 carbons; aryl; —C(O)$R^{10}$; —N$R^{11}R^{12}$; or —CO$R^{15}$;
$R^3$, $R^5$ and $R^7$ are independently selected from hydrogen, saturated or unsaturated, cyclic or acyclic, optionally substituted alkyl of 1-20 carbons or optionally substituted aryl of no more than four fused aromatic rings;
$R^2$ and $R^3$ or $R^7$ and $R^8$ may be taken together in each Formula to form a saturated or unsaturated optionally substituted ring;
$R^{10}$ and $R^{15}$ independently a saturated or unsaturated, cyclic or acyclic, optionally substituted alkyl of 1-20 carbons; carboxylic acid; ketone or an ester; and
$R^{11}$ and $R^{12}$ are independently selected from hydrogen; saturated or unsaturated, cyclic or acyclic, optionally substituted alkyl of 1-20 carbons; optionally substituted aryl with up to five fused aromatic rings; and
exposing at least a portion of said photopolymerization formulation to photons.

DESCRIPTION

The present invention is related to improvements in photopolymerization of monomers. More specifically, the present invention is related to the photopolymerization of ethylenically unsaturated compounds using photoinititators and an inventive synergist.

The photopolymerization process of the instant invention is done in accordance with conventional teachings in the art with the exception of the inclusion of the inventive synergist described herein below. The system employing the photopolymerization is not necessarily limited herein as the inventive synergist can be employed in any system where photopolymerization is commonly used such as, without limit thereto, the curing of coatings, the drying of printing inks, the curing of photo-curable systems such as those used in the formation of printing plates, 3-D printing and various other systems.

The instant invention increases the photoefficiency of the polymerization process, meaning that the number of polymerized monomers per photon of light increases. The instant invention increases the depth of penetration of polymerization thereby allowing for the use of photopolymerization in systems not previously accessible due to the inability of the photons to be of sufficient quantity to polymerize monomers at depth within the photopolymerization formation. The inventive synergist therefore expands the applicability of photopolymerization. In one instance, improved photoefficiency broadens those systems where photopolymerization is applicable. Improving photoefficiency possibly lowers cost which makes previously considered ventures more economically feasible.

Inventive photopolymerization formulations comprise one or more polymerizable ethylenically unsaturated monomers, oligomers or polymers a photoinitiator and an inventive synergist. Other additives may be included as will be further described herein.

Monomers, oligomers or polymers suitable for the polymerization formulation are preferably liquids at ambient temperature, defined herein as 25° C., thereby allowing for the polymerizable formulation to be coated onto or flow over a surface. Alternatively, the monomers, oligomers or polymers may be dissolved in any solvent typically used for the formation of a coating on a substrate or surface.

Specifically suitable for demonstration of the invention are acrylates and methacrylates such as methyl acrylate, ethyl acrylate, propyl acrylate, hexyl acrylate, isooctyl acrylate, methyl methacrylate, ethyl methacrylate, propyl methacrylate, hexyl methacrylate, isooctyl methacrylate, neopentyl diacrylate, trimethylolpropane triacrylate, glycerol triacrylate, tripropylene glycol diacrylate, isobornyl acrylate and the like; acrylonitrile; methacrylonitrile; vinyl esters such as vinyl acetate, vinyl propionate, vinyl acrylate and the like; styrene; divinylbenzene; vinyl chloride; N-vinylpyrrolidone; dialkyl phthalate; dialkyl maleate; ethylene glycol dialkyl ether; thermoplastic resins containing ethylenically unsaturated groups such as unsaturated polyesters derived from fumaric acid, maleic acid and citraconic acid and the like; ethylenically unsaturated dicarboxylic acids; acrylic resins; isocyanate-modified or epoxy-modified resins and the like.

In the formation of a polymerized product or coating the photopolymerization formulation is applied to a substrate or surface followed by exposure to light either simultaneously over the entire sample or specifically over a select portion of the sample. Those portions of monomer, oligomer or polymer exposed to the light polymerize whereas unexposed monomer, oligomer or polymer remain unchanged.

Light sources suitable for demonstration of the invention are not limited but conventional light sources include mercury vapor lamps, fluorescent light sources and laser light sources able to provide wavelengths in the 10-780 nm range. A light source with a significant emission with wavelengths in the ultraviolet to visible portion of the electromagnetic spectrum is preferred with a preference to shorter wavelengths such as 10 to 200 nm.

The term "photoinitiator" is used herein in accordance with the conventionally accepted meaning in the art to refer to an agent which renders a molecule, preferably a polymerizable ethylenically unsaturated monomer, sensitive to the action of light to initiate polymerization wherein the molecule is not otherwise sensitive to light.

Photoiniators are not particularly limited herein. A photoinitiator initiates polymerization of monomers in response to visible, UV, and/or far-UV wavelengths of light. Exemplary photoiniators include oxime-based compounds, triazine-based compounds, benzoin-based compound, acetophenone-based compounds, xanthone-based compounds, and imidazole-based compounds without limit thereto. Photoinitiators particularly suitable for demonstration of the invention include oxime-based compounds such as 1-[4-(Phenylthio)phenyl]-1,2-octanedione 2-(O-benzoyloxime) (OXE-01) or 1[9-Ethyl-6-(2-methylbenzoyl)-9H-carbazol-3-yl]-ethanone-1-(O-acetyloxime) (OXE-02) available from BASF SE; triazine-based compounds such as 2,4-bistrichloromethyl-6-p-methoxystyryl-s-triazine, 2-p-methoxystyryl-4,6-bistrichloromethyl-s-triazine, 2,4-trichloromethyl-6-triazine, or 2,4-trichloromethyl-4-methylnaphthyl-6-triazine; benzoin-based compounds such as benzophenone, 4-phenylbenzophenone, or p-(diethylamino)benzophenone; acetophenone-based compounds such as 2,2-dichloro-4-phenoxyacetophenone, 2,2-diethoxyacetophenone, 2,2-dibutoxyacetophenone, 2-hydroxy-2-methylpropiophenone, or p-t-butyltrichloroacetophenone; xanthone-based compounds such as xanthone, thioxanthone, 2-methylthio xanthone, 2-isobutylthioxanthone, 2-dodecylthioxanthone, 2,4-dimethylthioxanthone, or 2,4-diethylthioxanthone; and imidazole-based compounds such as 2,2-bis-2-chlorophenyl-4,5,4,5-tetraphenyl-2-1,2-bisimidazole or 2,2-bis(2,4,6-tricyanophenyl)-4,4,5,5-tetraphenyl-1,2-bisimidazole; ketone types such as benzildimethylketal, 1-hydroxycyclohexylphenylketone, or methyl-o-benzoyl-benzoate; phosphorous based compounds such as 2,4,6-trimethylbenzoyldiphenylphosphine oxide, or ethyl(2,4,6-trimethylbenzoyl)phenylphosphinate. Benzophenone is a particularly preferred photoinitiator due to the current wide-spread use, cost and synergistic advantages with the inventive synergist.

The photopolymerization formulation comprises 2-8 wt % photoinitiator, 85-95 wt % polymerizable ethylenically unsaturated monomer(s), oligomer or polymer and 1-3 wt % synergist and optionally at least one of a solvent or an additive.

The photopolymerization formulation may contain additives as known in the art, not otherwise altered herein, such as inhibitors to prevent premature polymerization, antioxidants, fillers, pigments, thickeners, rheology modifiers and the like without limit thereto.

A particular advantage of the inventive photopolymerization formulation is that the amount of photoinitiator can be reduced relative to conventional formulations. Another advantage is that the photoinitiator benzophenone is highly effective with the synergists of the present invention.

The inventive synergists is effective with hydrogen abstraction types of photoinitiator, such as benzophenone and when used with photoinitiators that function by homolytic fragmentation. The inventive synergist works well when used in conjunction with the typical prior art amine synergists.

Inventive synergist are represented by:

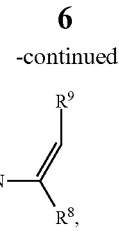

Formula I

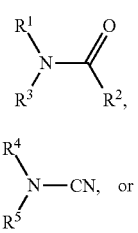

Formula II

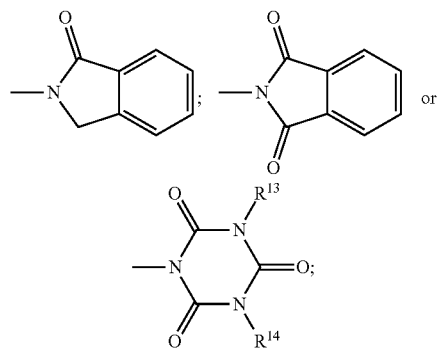

Formula III wherein:
$R^1$, $R^4$, $R^6$ and $R^9$ are independently selected from an alkene, a cyclic olefin, aryl, cyclic heteroatom containing group or acylic heteroatom containing group each of which is optionally substituted; more preferably $R^1$, $R^4$, $R^6$ and $R^9$ are independently selected from alkenes having up to 20 carbons, aryls having at least one aromatic ring and preferably no more than four fused aromatic rings, furan ring, thiophene ring, imidazole ring, pyrrole ring, pyridine ring and pyrimidine ring each of which is optionally substituted; most preferably $R^1$, $R^4$, $R^6$ and $R^9$ are independently selected from benzyl, allyl and furan ring each of which is optionally substituted;
$R^2$ and $R^8$ are independently selected from hydrogen; linear or branched alkyl of 1 to 10 carbons; aryl; —C(O)$R^{10}$; —N$R^{11}R^{12}$; or —COR$^{15}$;
$R^3$, $R^5$ and $R^7$ are independently selected from hydrogen, saturated or unsaturated, cyclic or acyclic, optionally substituted alkyl of 1-20 carbons or optionally substituted aryl of no more than four fused aromatic rings; in a preferred embodiment $R^3$, $R^5$ and $R^7$ are benzyl;
$R^2$ and $R^3$ or $R^7$ and $R^8$ may be taken together in each Formula to form a saturated or unsaturated optionally substituted ring; in a preferred embodiment $R^2$ and $R^3$ or $R^7$ and $R^8$ are taken together to represent substituted or unsubstituted pyrroline, triazinine or pyrrolidine; even more preferably $R^2$ and $R^3$ or $R^7$ and $R^8$ are taken together to form:

$R^{10}$ and $R^{15}$ are independently a saturated or unsaturated, cyclic or acyclic, optionally substituted alkyl of 1-20 carbons; carboxylic acid; ketone or an ester;
$R^{11}$ and $R^{12}$ are independently selected from hydrogen; saturated or unsaturated, cyclic or acyclic, optionally substituted alkyl of 1-20 carbons; optionally substituted aryl with up to five fused aromatic rings; and
each $R^{13}$ and $R^{14}$ are independently selected from hydrogen; saturated or unsaturated, cyclic or acyclic, optionally substituted alkyl of 1-20 carbons; optionally substituted aryl with up to four fused aromatic rings; in a preferred embodiment $R^{13}$ and $R^{14}$ are benzyl.

Each of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$, is independently substituted at a carbon with a group selected from a hydroxyl, an allyl, an ether, a carboxylic acid, an ester, an amine, an amide and a halogen.
Particularly preferred synergist are represented by compounds below wherein compounds 9, 10 and 21 are controls and the reference numbers are referred to in the examples.
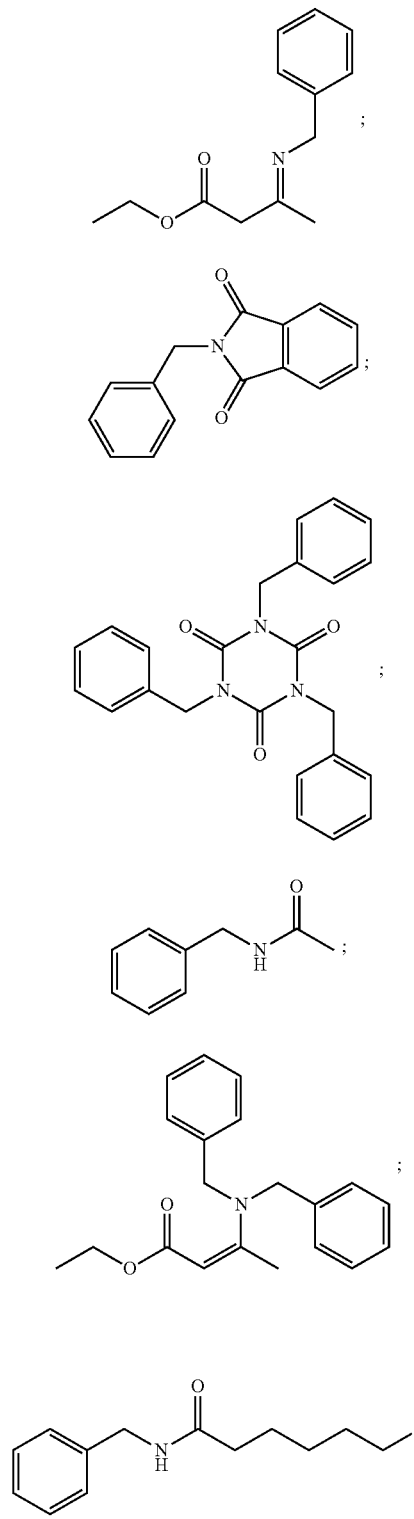
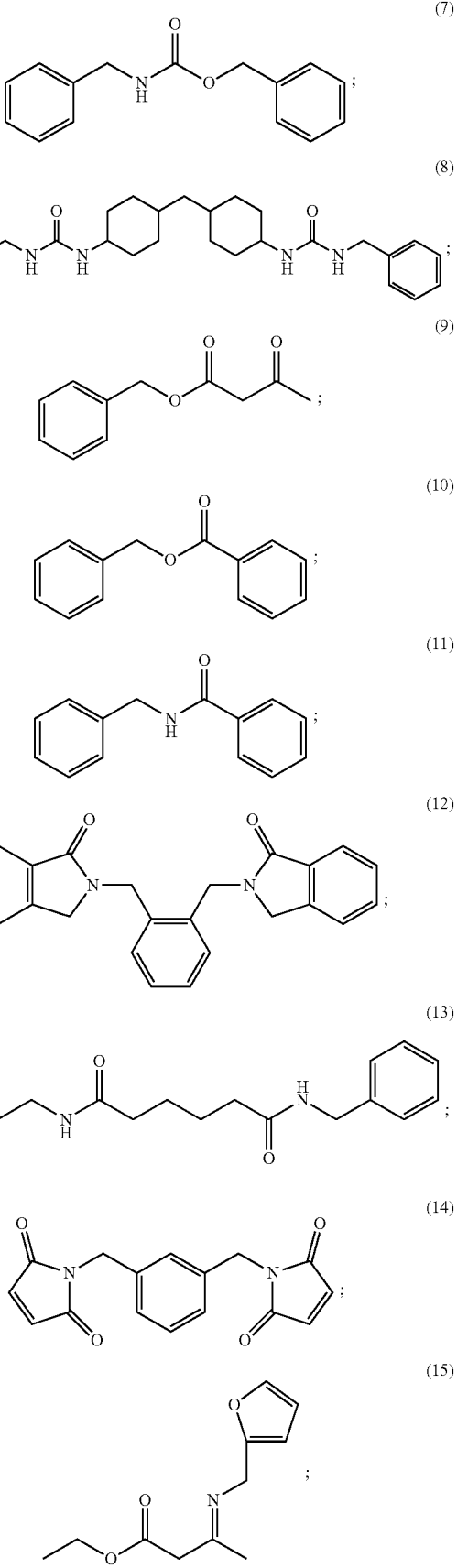

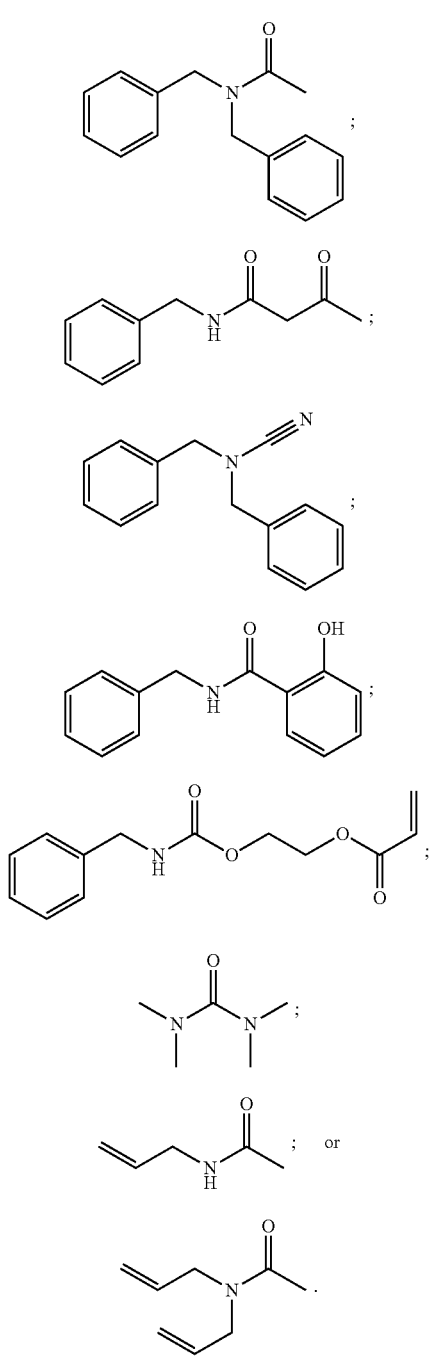

Preparation of N-benzylacetamide (4)

Benzylamine 224.96 g was added to acetic anhydride 225.04 g and heated to 120° C. and held for 1 hour. The crude product was washed with an equal weight of water and the final product was obtained after drying and removal of residual acetic acid.

Preparation of Ethyl 3-(benzylimino)butyrate (1)

Benzylamine 274.7 g was added to ethyl acetoacetate 297.7 g and heated to 150° C. with water distillation occurring during heating. The title compound was recovered as 505.7 g (88.35% yield) as an amber liquid which crystallized upon standing to a solid with melting point 34-36° C.

Preparation of Ethyl 3-[bis(benzyl)amino]-2-butenoate (5)

Dibenzylamine 283.3 g was added to ethyl acetoacetate 166.7 g and heated to 150° C. with water distillation occurring during heating. The title compound was recovered as a thick amber liquid.

Preparation of N-benzyl-6-hydroxycaproamide (6)

Benzylamine 212.4 g was added to ε-caprolactone 243.6 g and heated to 180° C. and held for 23 hours. The title compound was recovered as 443.3 g (98.5% yield) as a nearly colorless liquid.

Preparation of N-benzylphthalimide (2)

Benzylamine 214 g was added to phthalic anhydride 296 g at 150° C. The temperature was increased to 180° C. and held for three hours with water distillation. The title compound was a pale yellow solid with melting point 46° C.

Preparation of N, O-dibenzylcarbamate (7)

To a solution of benzyl isocyanate 20.02 g in ethyl acetate 198.7 g was added benzyl alcohol 16.26 g. The reaction was heated to 80° C. and the reaction was monitored by infrared for isocyanate stretching. After 14 hours the reaction was judged to be complete. Evaporation of the solvent produced a white solid melting at 60-65° C.

Preparation of N, N'-dibenzyl-N, N'-dicyclohexylmethane-4, 4'-diurea (8)

To a solution of dicyclohexylmethane-4, 4'-diisocyante 26 g in ethyl acetate 250 g was added benzylamine 21.4 g. The reaction was heated to 40° C. and the reaction was monitored by infrared for isocyanate stretching. After 6 hours the reaction was judged to be complete. The title compound was recovered by filtration, washed with methanol and dried overnight to afford 43.2 g (89% yield) of a white solid with a melting point of 185-195° C.

Preparation of Ethyl 3-(furfurylimino)butyrate

Furfurylamine 97.1 g was added to methyl acetoacetate 116 g and heated to 150° C. with water distillation occurring during heating to afford 190 g (90% yield) of an orange liquid.

Preparation of Tribenzyl Isocyanurate (3)

As per U.S. Pat. No. 3,075,979 afforded white needles melting point 161-163° C.

Preparation of M-xylylene Bis-phthalimide (12)

As per U.S. Pat. No. 7,994,245 afforded a white solid melting point 154-157° C.

Preparation of N-allyl Acetamide (22)

To acetic anhydride 140.6 g was added allylamine 74.9 g and the resulting clear solution was held for 1 hour before being allowed to stand overnight. The acetic acid was removed by steam spanging the solution to afford a clear pale-yellow liquid.

Preparation of N,N-diallyl Acetamide (23)

To acetic anhydride 178.6 g was added diallylamine 161.7 g and the resulting clear solution was held for 1 hour before being allowed to stand overnight. The acetic acid was removed by steam spanging the solution to afford a clear dark yellow liquid.

Preparation of N-benzylureidoethyl Acrylate (20)

To benzylisocyanate 4.8 g was added hydroxyethyl acrylate 4.2 g and dibutyltin dilaurate 1 drop. The reaction was checked after 1 hour by FT-IR and was used without purification.

Preparation of Dibenzyl Cyanamide (18)

As per Synthesis 1978(12):882-883 afforded a white solid of melting point 53° C.

Preparation of N-benzylacetoacetamide (17)

As per J. Org. Chem. 1985, 50, 2431-2435.

All other chemicals were used as received from commercial sources.

Multiple experiments were conducted to demonstrate the synergistic effect and to demonstrate a reduction in the amount of photoinitiator necessary. For the following experiments all samples were exposed by transiting through a Fusion UV Systems F300/F305 at a coating thickness of 0.172 g/cm² which is equivalent to about 10 g of sample on an aluminum pan with a diameter of about 9 cm.

Table 1 shows the photopolymerization formulation that was used to determine the synergist's capability.

TABLE 1

| Components | Amount (wt. g) |
| --- | --- |
| Dipropylene glycol diacrylate | 12 |
| Bisphenol A Epoxy diacrylate | 57.6 |
| Trimethylolpropane triacrylate | 14.4 |
| Glycerine Triacrylate | 29.04 |
| 3-Methacryloxypropyl trimethoxysilane | 1.2 |
| Benzophenone (BP) | 1.2 |

TABLE 2

| Synergist Samples | Amount (wt. g) |
| --- | --- |
| N-benzylacetoacetamide (1) | 1.12 |
| N-benzylphthalimide (2) | 1.43 |
| Tribenzylisocyanurate (3) | 0.8 |

Table 2 shows the amount of synergist that was added to the formulation.

All samples were exposed in a Fusion UV Systems F300/F305 twice at a speed of 0.4 m/min with irradiation by a mercury lamp. Synergist (1) demonstrated superior performance with no tackiness observed. Synergist (2) and (3) exhibited tackiness on the top of the film.

Typical prior art amine synergists can also be added to promote tack-free curing. EHA (2-Ethylhexyl-4-dimethyl-aminobenzoate) is known to improve curing without detrimental impact on the inventive synergist. To the formulation described in Table 1 and added 0.6 g of EHA, which improved the surface cure of the film. MDEA (N-methyl-diethanolamine) and EPD (Ethyl-4-dimethylaminobenzoate), which are commonly employed, demonstrated synergistic advantages with no adverse effect on the film and without detriment to the effect of the inventive synergist.

To verify that it wasn't the amine synergist that was responsible for the complete cure, we removed the synergist (1) and increased the prior art amine synergists to a total of 1.7 g. Creating a film with just the photoinitiator (BP) and EHA produced an incomplete reaction and there was visible residue left over with tackiness being prevalent thereby demonstrating the effectiveness of the inventive synergist.

A number of experiments with varying amounts of photoinitiator and synergist initially showed that a composition comprising 30% BP and 70% of Synergist (1) had the most complete cure. This ratio could be optimized for each formulation and can vary widely. Removing the photoinitiator, as expected, produces an incomplete cure.

Prior art amine synergists improve the curing of the top of the film, while the inventive synergists provides curing within the film. In conjunction, they can produce the same properties as more complex photoinitiator systems.

Table 3 shows the synergist used and the amounts used in the formulation from Table 1. For evaluation purposes, a method was developed to determine which samples performed best and cured the best. Tackiness was characterized from 1 to 4. No tackiness was designated as 1, slight tackiness on only one side of the sample was designated 2, tackiness on both sides was designated 3 and visible liquid on top or bottom of the sample or extreme tackiness was designated 4.

TABLE 3

| Synergist Samples | Amount (wt. g) | Tackiness |
| --- | --- | --- |
| N-benzylacetamide (4) | 1.8 | 2 |
| Ethyl 3-(benzylimino)butyrate (1) | 1.12 | 1 |
| Ethyl 3-[bis(benzyl)amino]-2-butenoate (5) | 1.54 | 2 |
| N-benzyl-6-hydroxycaproamide (6) | 0.94 | 2 |
| N-benzylphthalimide (2) | 1.43 | 2 |
| N,O-dibenzylcarbamate (7) | 0.8 | 2 |
| N,N'-dibenzyl-N,N'-dicyclohexylmethane-4,4'-diurea (8) | 1.8 | 2 |
| Benzyl acetoacetate (9) | 1.12 | 4 |
| Benzyl benzoate (10) | 1.24 | 4 |
| N-Benzylbenzamide (11) | 1.24 | 2 |
| Tribenzylisocyanurate (3) | 0.8 | 1 |
| Xylylenebisphthalimide (12) | 0.82 | 2 |
| N,N'-dibenzyladipamide (13) | 1.0 | 2 |
| Xylylenebismaleimide (14) | 0.84 | 3 |
| Methyl 3-(furfurylimino)butyrate (15) | 0.96 | 3 |
| Dibenzylacetamide (16) | 0.75 | 1 |
| N-benzylacetoacetamide (17) | 1.05 | 1 |
| Dibenzylcyanamide (18) | 1.0 | 2 |
| N-benzylsalicyamide (19) | 1.0 | 2 |
| N-benzylureidoethyl acrylate (20) | 1.0 | 2 |
| Tetramethylurea (21) | 1.26 | 3 |
| Allylacetamide (22) | 1.0 | 2 |
| Diallylacetamide (23) | 1.0 | 1 |

The results present in Table 3 demonstrate that the inventive synergist were effective synergists whether they were amides, imides, urethanes, ureas and cyanamides. The benzyl esters (9) and (10) were ineffective as synergists. Also ineffective was a urea (21) without benzyl substitution. The synergist samples where demonstrated to function adequately and advantageously with prior art amine synergists. The choice of an additional prior art amine; such as EHA, MDEA or EPD; did not change the physical properties nor the curing speed of the product.

When speed of the samples passing through the Fusion UV Systems F300/F305 increased to 0.8 m/min, the 30/70 wt % ratio formulation was inadequate, however, a 50/50 wt % ratio of BP/synergist was sufficient. The 50/50 wt % ratio was compared to a combination of 2,4,6-trimethylbenzoyl-diphenylphosphine oxide (TPO) and benzildimethylketal (BDK.) The BP/synergist performed not as good as the combination of TPO and BDK, however this may be due more to photoinitiator being BP, instead of BDK or TPO. To the photopolymeration formulation of Table 1 was added 0.3 g of TPO and 1.5 g of BDK without any of the amine synergists. The reaction was compared to Synergist (1) at 0.7 g and EHA at 0.6 g with BDK at 0.7 g. Surprisingly, there were no differences between the two formulations. The use of Synergist (1) of this invention allows for a reduction of the photoinitiator used by over 50 wt %. In addition, this shows that the synergist is effective with initiators that function by homolytic fragmentation.

TABLE 4

| Components | Amount (wt. g) | Amount (wt. g) |
| --- | --- | --- |
| TPO | 0.3 | 0 |
| BDK | 1.5 | 0.7 |
| EHA | 0 | 0.6 |
| Synergist (1) | 0 | 0.7 |

The resin formulation of Table 1 was catalyzed as shown in Table 4. A fiberglass rod with a diameter of 2 mm was circulated through a bath with the resin at 20 m/min, 60 m/min and at 90 m/min. The resin bath was preheated to about 40.5° C. and the glass was preheated to about 371° C. The coated glass rod was fully cured at all speeds. All three fiberglass rods had suitable strength performance.

We also examined synergist (16) in our standard formulation using TPO and BDK as photoinitiators and found both of these formulations to have an equal degree of cure. Use of the synergist (16) of this invention allowed for a reduction of the photoinitiator used by 50%. In addition, this shows that this synergist is effective with initiators that function by homolytic fragmentation.

TABLE 5

| Components | Amount (wt. g) | Amount (wt. g) |
|---|---|---|
| TPO | 0.3 | 0.15 |
| BDK | 1.5 | 0.75 |
| Synergist (16) | 0 | 0.6 |

We examined (16) in some detail in a inkjet formulation comprised of isobornyl acrylate and tripropylene glycol diacrylate (50/50 wt %) with the photoinitiator 1-hydroxy-cyclohexylphenylketone (CPK). We obtained these results:

TABLE 6

| Initiator (wt %) | Viscosity (cPs) | Modulus (MPa) | Strength (MPa) | Elongation (%) | FTIR Conversion |
|---|---|---|---|---|---|
| CPK (8%) | 15 | 760 | 27 | 6.6 | 99% |
| CPK (4%) Synergist (16) (0.75%) | 8 | 870 | 31 | 5.8 | 98% |

A small amount of synergist (16) allows for a 50 wt % reduction of the CPK photoinitiator to produce nearly identical physical properties. We also note that when the above formulations were checked for depth of cure that this property had improved from 6.89 mm using CPK (8 wt %) to 8.15 mm using CPK (4 wt %) and synergist (16) (0.75 wt %).

The results demonstrate improved photonic efficiency as evidenced by the improved curing rate and the ability to decrease the amount of photoinitiator in the monomer mixture.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A photopolymerization formulation comprising:
   a polymerizable ethylenically unsaturated monomer, oligomer or polymer;
   a photoinitiator; and
   a synergist selected from the group consisting of Formula I, Formula II and Formula III;

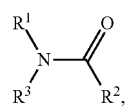
Formula I

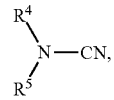
Formula II

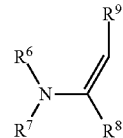
Formula III wherein:
$R^1$, $R^4$, $R^6$ and $R^9$ are independently selected from an alkene, a cyclic olefin, aryl, cyclic heteroatom containing group or acylic heteroatom containing group each of which is optionally substituted;
$R^2$ and $R^8$ are independently selected from hydrogen; linear or branched alkyl of 1 to 10 carbons; aryl; —C(O)R$^{10}$; —NR$^{11}$R$^{12}$; or —COR$^{15}$;
$R^3$, $R^5$ and $R^7$ are independently selected from hydrogen, saturated or unsaturated, cyclic or acyclic, optionally substituted alkyl of 1-20 carbons or optionally substituted aryl of no more than four fused aromatic rings;
$R^2$ and $R^3$ may be taken together to form a saturated or unsaturated optionally substituted ring;
$R^7$ and $R^8$ may be taken together to form a saturated optionally substituted ring;
$R^{10}$ and $R^{15}$ independently a saturated or unsaturated, cyclic or acyclic, optionally substituted alkyl of 1-20 carbons; carboxylic acid; ketone or an ester; and
$R^{11}$ and $R^{12}$ are independently selected from hydrogen; saturated or unsaturated, cyclic or acyclic, optionally substituted alkyl of 1-20 carbons; optionally substituted aryl with up to five fused aromatic rings.

2. The photopolymerization formulation of claim 1 wherein $R^1$, $R^4$, $R^6$ and $R^9$ are independently selected from alkenes having up to 20 carbons, aryls having at least one aromatic ring to no more than four fused aromatic rings, furan ring, thiophene ring, imidazole ring, pyrrole ring, pyridine ring and pyrimidine ring each of which is optionally substituted.

3. The photopolymerization formulation of claim 2 wherein $R^1$, $R^4$, $R^6$ and $R^9$ are independently selected from benzyl, allyl and furan ring each of which is optionally substituted.

4. The photopolymerization formulation of claim 1 wherein at least one of $R^3$, $R^5$ or $R^7$ is benzyl.

5. The photopolymerization formulation of claim 1 wherein
$R^2$ and $R^3$ or $R^7$ and $R^8$ are taken together to represent substituted or unsubstituted isocyanurate or pyrrolidinone.

6. The photopolymerization formulation of claim 1 wherein $R^2$ and $R^3$ or $R^7$ and $R^8$ are taken together to form:

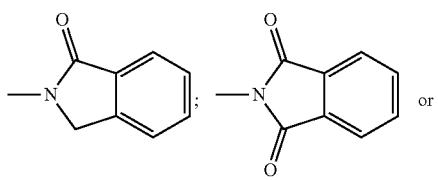

-continued

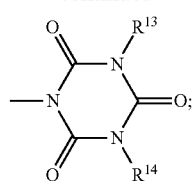

wherein each $R^{13}$ and $R^{14}$ are independently selected from hydrogen; saturated or unsaturated, cyclic or acyclic, optionally substituted alkyl of 1-20 carbons; optionally substituted aryl with up to four fused aromatic rings.

7. The photopolymerization formulation of claim 6 wherein $R^{13}$ and $R^{14}$ are benzyl.

8. The photopolymerization formulation of claim 6 wherein at least one $R^{13}$ or $R^{14}$ is independently substituted at a carbon with a group selected from a hydroxyl, an allyl, an ether, a carboxylic acid, an ester, an amine, an amide and a halogen.

9. The photopolymerization formulation of claim 1 wherein at least one of $R^1$, $R^2$, $R^3$, $R^4$, $R^5$, $R^6$, $R^7$, $R^8$, $R^9$, $R^{10}$, $R^{11}$, $R^{12}$ or $R^{15}$ is idependently substituted at a carbon with a group selected from a hydroxyl, an allyl, an ether, a carboxylic acid, an ester, an amine, an amide and a halogen.

10. The photopolymerization formulation of claim 1 wherein said synergist is selected from the group consisting of:

(1)

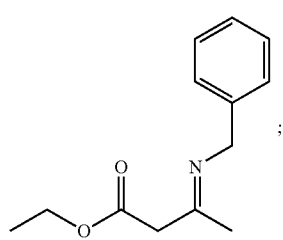

(2)

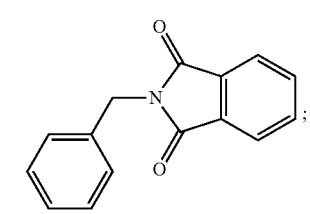

(3)

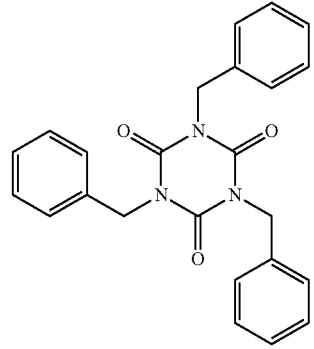

(4)

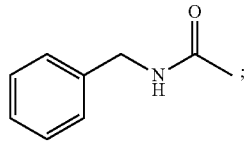

(5)

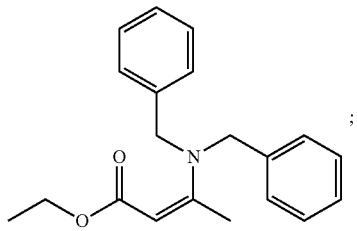

(6)

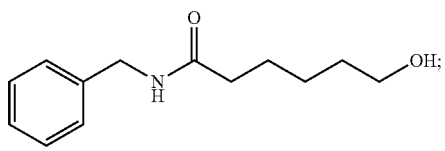

(7)

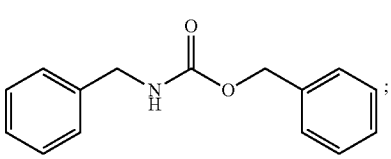

(8)

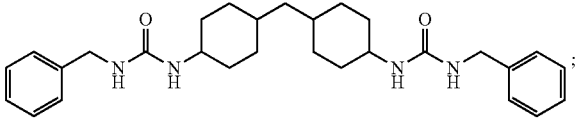

(11)

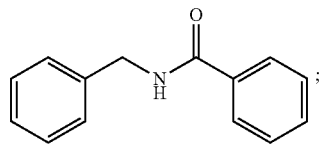

(12)

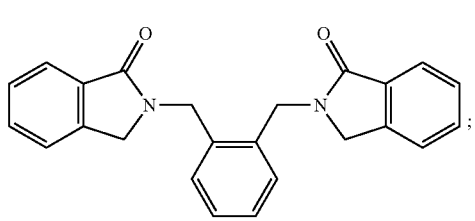

(13)

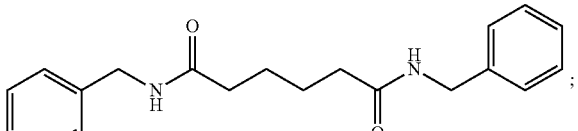

(14)

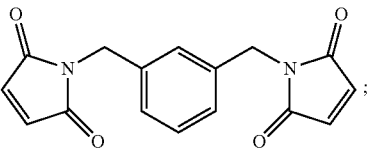

-continued

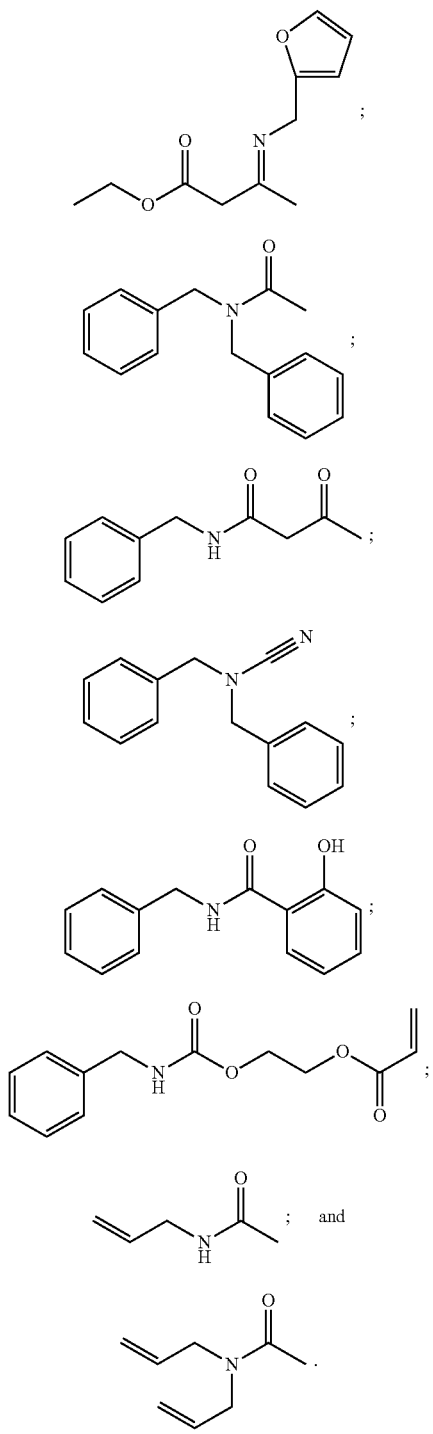

11. The photopolymerization formulation of claim 1 wherein said polymerizable ethylenically unsaturated monomer, oligomer or polymer is selected from the group consisting of acrylates and methacrylates; acrylonitrile; methacrylonitrile; vinyl esters; styrene; divinylbenzene; vinyl chloride; N-vinylpyrrolidone; dialkyl phthalate; dialkyl maleate; ethylene glycol dialkyl ether; thermoplastic resins containing ethylenically unsaturated groups; ethylenically unsaturated dicarboxylic acids; acrylic resins; isocyanate-modified and epoxy-modified resins.

12. The photopolymerization formulation of claim 11 wherein said polymerizable ethylenically unsaturated monomer, oligomer or polymer is selected from the group consisting of methyl acrylate, ethyl acrylate, propyl acrylate, hexyl acrylate, isooctyl acrylate, methyl methacrylate, ethyl methacrylate, propyl methacrylate, hexyl methacrylate, isooctyl methacrylate, neopentyl diacrylate, trimethylolpropane triacrylate, glycerol triacrylate, tripropylene glycol diacrylate, and isobornyl acrylate.

13. The photopolymerization formulation of claim 11 wherein said polymerizable ethylenically unsaturated monomer, oligomer or polymer is selected from the group consisting of vinyl acetate, vinyl propionate and vinyl acrylate.

14. The photopolymerization formulation of claim 11 wherein said polymerizable ethylenically unsaturated monomer, oligomer or polymer is selected from the group consisting of unsaturated polyesters derived from fumaric acid, maleic acid and citraconic acid.

15. The photopolymerization formulation of claim 1 wherein said photoinitiator is selected from the group consisting of oxime-based compounds, triazine-based compounds, benzoin-based compound, acetophenone-based compounds, xanthone-based compounds, and imidazole-based compounds.

16. The photopolymerization formulation of claim 15 wherein said photoinitiator is selected from the group consisting of 1-[4-(Phenylthio)phenyl]-1,2-octanedione 2-(O-benzoyloxime), 1-[9-Ethyl-6-(2-methylbenzoyl)-9H-carbazol-3-yl]-ethanone-1-(O-acetyloxime); 2,4-bistrichloromethyl-6-p-methoxystyryl-s-triazine; 2-p-methoxystyryl-4,6-bistrichloromethyl-s-triazine; 2,4-trichloromethyl-6-triazine; 2,4-trichloromethyl-4-methylnaphthyl-6-triazine; benzophenone; 4-phenylbenzophenone; p-(diethylamino)benzophenone; 2,2-dichloro-4-phenoxyacetophenone; 2,2-diethoxyacetophenone; 2,2-dibutoxyacetophenone; 2-hydroxy-2-methylpropiophenone; p-t-butyltrichloroacetophenone; xanthone; thioxanthone; 2-methylthio xanthone; 2-isobutylthioxanthone; 2-dodecylthioxanthone; 2,4-dimethylthioxanthone; 2,4-diethylthioxanthone; 2,2-bis-2-chlorophenyl-4,5,4,5-tetraphenyl-2-1,2-bisimidazole; 2,2-bis(2,4,6-tricyanophenyl)-4,4,5,5-tetraphenyl-1,2-bisimidazole; benzildimethylketal; 1-hydroxycyclohexylphenylketone; methyl-o-benzoyl-benzoate; 2,4,6-trimethylbenzoyldiphenylphosphine oxide; and ethyl(2,4,6-trimethylbenzoyl) phenylphosphinate.

17. The photopolymerization formulation of claim 16 wherein said photoinitiator is benzophenone.

18. The photopolymerization formulation of claim 1 comprising 2-8 wt % said photoinitiator; 85-95 wt % said polymerizable ethylenically unsaturated monomer, oligomer or polymer and 1-3 wt % said synergist.

19. The photopolymerization formulation of claim 1 further comprising at least one additive.

20. The photopolymerization formulation of claim 19 wherein said additive is selected from the group consisting of inhibitors, antioxidants, fillers, pigments, thickeners and rheology modifiers.

21. The photopolymerization formulation of claim 1 further comprising at least one compound selected from the group consisting of N-methyldiethanolamine, ethyl-4-dimethylaminobenzoate, and 2-ethylhexyl-4-dimethylaminobenzoate.

22. A method of forming an object comprising:
  forming a photopolymerization formulation comprising:
    a polymerizable ethylenically unsaturated monomer, oligomer or polymer;
    a photoinitiator; and a synergist selected from the group consisting of Formula I, Formula II and Formula III;

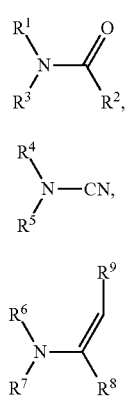

Formula I

Formula II

Formula III wherein:

R$^1$, R$^4$, R$^6$ and R$^9$ are independently selected from an alkene, a cyclic olefin, aryl, cyclic heteroatom containing group or acylic heteroatom containing group each of which is optionally substituted;

R$^2$ and R$^8$ are independently selected from hydrogen; linear or branched alkyl of 1 to 10 carbons; aryl; —C(O)R$^{10}$; —NR$^{11}$R$^{12}$; or —COR$^{15}$;

R$^3$, R$^5$ and R$^7$ are independently selected from hydrogen, saturated or unsaturated, cyclic or acyclic, optionally substituted alkyl of 1-20 carbons or optionally substituted aryl of no more than four fused aromatic rings;

R$^2$ and R$^3$ may be taken together to form a saturated or unsaturated optionally substituted ring;

R$^7$ and R$^8$ may be taken together to form a saturated optionally substituted ring;

R$^{10}$ and R$^{15}$ independently a saturated or unsaturated, cyclic or acyclic, optionally substituted alkyl of 1-20 carbons; carboxylic acid; ketone or an ester; and R$^{11}$ and R$^{12}$ are independently selected from hydrogen; saturated or unsaturated, cyclic or acyclic, optionally substituted alkyl of 1-20 carbons; optionally substituted aryl with up to five fused aromatic rings; and exposing at least a portion of said photopolymerization formulation to photons.

23. The method of forming an object of claim 22 wherein R$^1$, R$^4$, R$^6$ and R$^9$ are independently selected from alkenes having up to 20 carbons, aryls having at least one aromatic ring to no more than four fused aromatic rings, furan ring, thiophene ring, imidazole ring, pyrrole ring, pyridine ring and pyrimidine ring each of which is optionally substituted.

24. The method of forming an object of claim 23 wherein R$^1$, R$^4$, R$^6$ and R$^9$ are independently selected from benzyl, allyl and furan ring each of which is optionally substituted.

25. The method of forming an object of claim 22 wherein at least one of R$^3$, R$^5$ or R$^7$ is benzyl.

26. The method of forming an object of claim 22 wherein

R$^2$ and R$^3$ or R$^7$ and R$^8$ are taken together to represent substituted or unsubstituted isocyanurate or pyrrolidinone.

27. The method of forming an object of claim 22 wherein R$^2$ and R$^3$ or R$^7$ and R$^8$ are taken together to form:

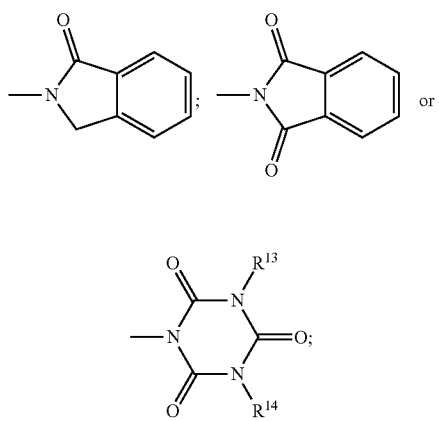

wherein each R$^{13}$ and R$^{14}$ are independently selected from hydrogen; saturated or unsaturated, cyclic or acyclic, optionally substituted alkyl of 1-20 carbons; optionally substituted aryl with up to four fused aromatic rings.

28. The method of forming an object of claim 27 wherein R$^{13}$ and R$^{14}$ are benzyl.

29. The method of forming an object of claim 27 wherein at least one R$^{13}$ or R$^{14}$ is independently substituted at a carbon with a group selected from a hydroxyl, an allyl, an ether, a carboxylic acid, an ester, an amine, an amide and a halogen.

30. The method of forming an object of claim 22 wherein at least one of R$^1$, R$^2$, R$^3$, R$^4$, R$^5$, R$^6$, R$^7$, R$^8$, R$^9$, R$^{10}$, R$^{11}$, R$^{12}$ or R$^{15}$ is independently substituted at a carbon with a group selected from a hydroxyl, an allyl, an ether, a carboxylic acid, an ester, an amine, an amide and a halogen.

31. The method of forming an object of claim 22 wherein said synergist is selected from the group consisting of:

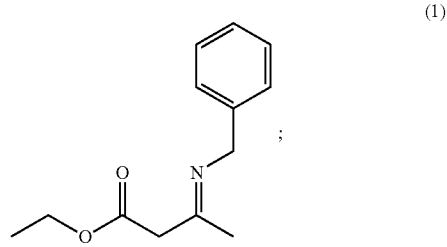

(1)

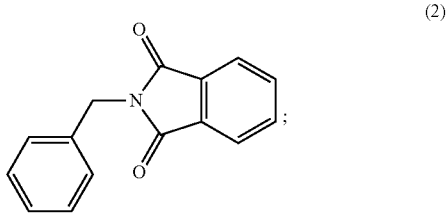

(2)

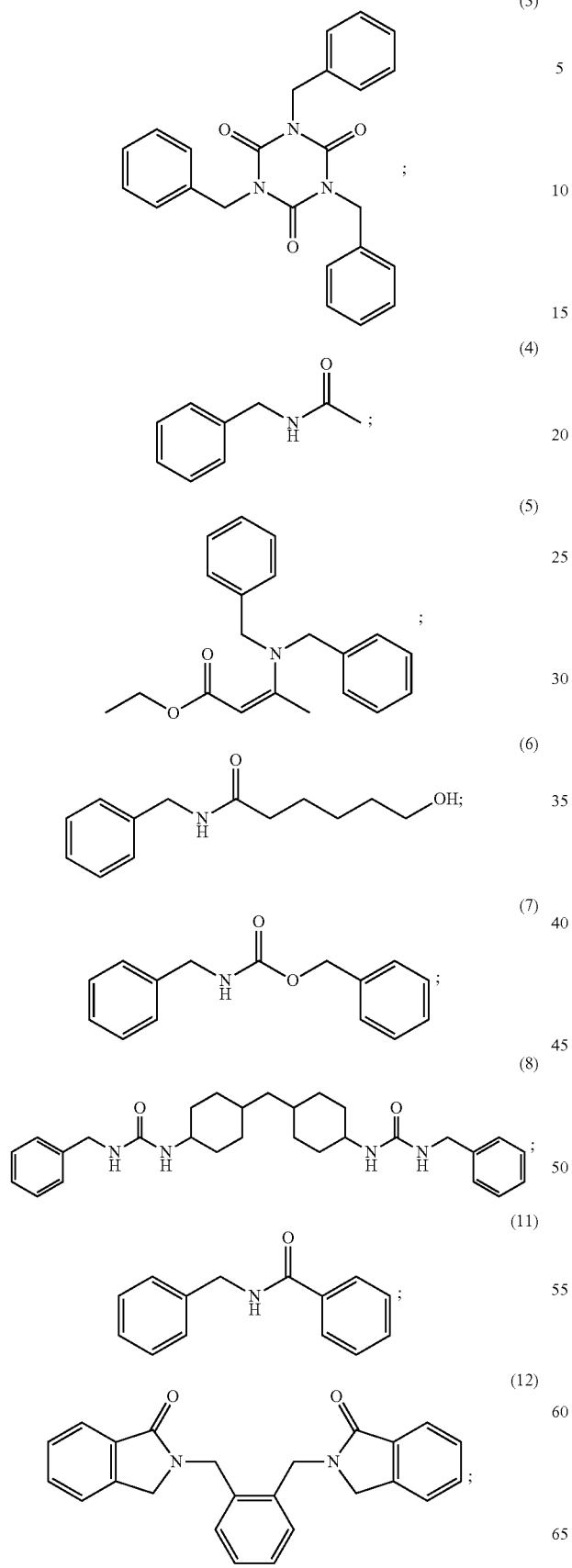
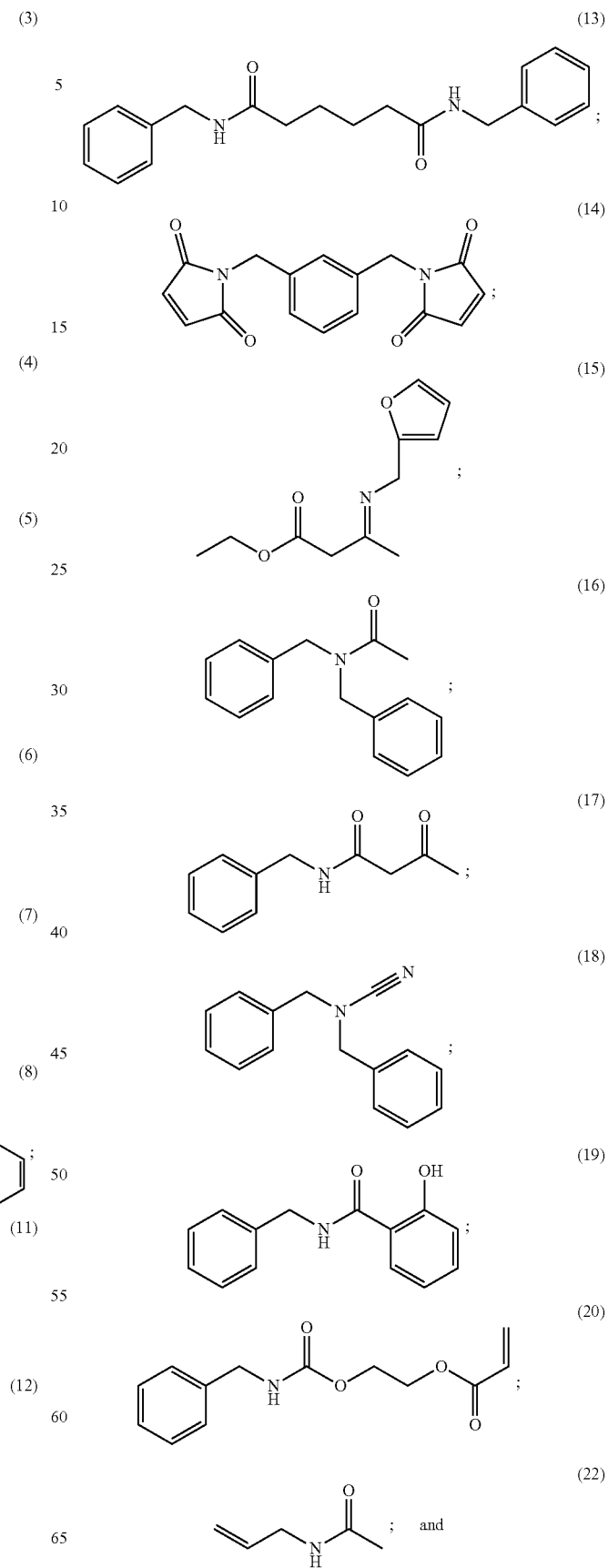

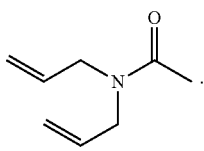
(23)

32. The method of forming an object of claim 22 wherein said photons have a wavelength of 10 to 780 nm.

33. The method of forming an object of claim 32 wherein said photons have a wavelength of 10 to 200 nm.

34. The method of forming an object of claim 22 further comprising applying said photopolymerization formulation to a substrate or surface prior to said exposing.

35. The method of forming an object of claim 22 wherein said polymerizable ethylenically unsaturated monomer, oligomer or polymer is selected from the group consisting of acrylates and methacrylates; acrylonitrile; methacrylonitrile; vinyl esters; styrene; divinylbenzene; vinyl chloride; N-vinylpyrrolidone; dialkyl phthalate; dialkyl maleate; ethylene glycol dialkyl ether; thermoplastic resins containing ethylenically unsaturated groups; ethylenically unsaturated dicarboxylic acids; acrylic resins; isocyanate-modified and epoxy-modified resins.

36. The method of forming an object of claim 35 wherein said polymerizable ethylenically unsaturated monomer, oligomer or polymer is selected from the group consisting of methyl acrylate, ethyl acrylate, propyl acrylate, hexyl acrylate, isooctyl acrylate, methyl methacrylate, ethyl methacrylate, propyl methacrylate, hexyl methacrylate, isooctyl methacrylate, neopentyl diacrylate, trimethylolpropane triacrylate, glycerol triacrylate, tripropylene glycol diacrylate, and isobornyl acrylate.

37. The method of forming an object of claim 34 wherein said polymerizable ethylenically unsaturated monomer, oligomer or polymer is selected from the group consisting of vinyl acetate, vinyl propionate and vinyl acrylate.

38. The method of forming an object of claim 34 wherein said polymerizable ethylenically unsaturated monomer, oligomer or polymer is selected from the group consisting of unsaturated polyesters derived from fumaric acid, maleic acid and citraconic acid.

39. The method of forming an object of claim 22 wherein said said photoinitiator is selected from the group consisting of oxime-based compounds, triazine-based compounds, benzoin-based compound, acetophenone-based compounds, xanthone-based compounds, and imidazole-based compounds.

40. The method of forming an object of claim 38 wherein said photoinitiator is selected from the group consisting of 1-[4-(Phenylthio)phenyl]-1,2-octanedione 2-(O-benzoyloxime), 1-[9-Ethyl-6-(2-methylbenzoyl)-9H-carbazol-3-yl]-ethanone-1-(O-acetyloxime); 2,4-bistrichloromethyl-6-p-methoxystyryl-s-triazine; 2-p-methoxystyryl-4,6-bistrichloromethyl-s-triazine; 2,4-trichloromethyl-6-triazine; 2,4-trichloromethyl-4-methylnaphthyl-6-triazine; benzophenone; 4-phenylbenzophenone; p-(diethylamino) benzophenone; 2,2-dichloro-4-phenoxyacetophenone; 2,2-diethoxyacetophenone; 2,2-dibutoxyacetophenone; 2-hydroxy-2-methylpropiophenone; p-t-butyltrichloroacetophenone; xanthone; thioxanthone; 2-methylthio xanthone; 2-isobutylthioxanthone; 2-dodecyl-thioxanthone; 2,4-dimethylthioxanthone; 2,4-diethylthioxanthone; 2,2-bis-2-chlorophenyl-4,5,4,5-tetraphenyl-2-1,2-bisimidazole; 2,2-bis(2,4,6-tricyanophenyl)-4,4,5,5-tetraphenyl-1,2-bisimidazole; benzildimethylketal; 1-hydroxycyclohexylphenylketone; methyl-o-benzoyl-benzoate; 2,4,6-trimethylbenzoyldiphenylphosphine oxide; and ethyl(2,4,6-trimethylbenzoyl) phenylphosphinate.

41. The method of forming an object of claim 40 wherein said photoinitiator is benzophenone.

42. The method of forming an object of claim 22 comprising 2-8 wt % said photoinitiator, 85-95 wt % said polymerizable ethylenically unsaturated monomer, oligomer or polymer and 1-3 wt % said synergist.

43. The method of forming an object of claim 22 further comprising at least one additive.

44. The method of forming an object of claim 22 wherein said additive is selected from the group consisting of inhibitors, antioxidants, fillers, pigments, thickeners and rheology modifiers.

45. The method of forming an object of claim 22 wherein said photopolymerization formulation further comprises at least one compound selected from the group consisting of N-methyldiethanolamine, ethyl-4-dimethylaminobenzoate, and 2-ethylhexyl-4-dimethylaminobenzoate.

* * * * *